(12) United States Patent
Chang et al.

(10) Patent No.: US 11,235,736 B2
(45) Date of Patent: Feb. 1, 2022

(54) ROCKER-TYPE ASSEMBLY DEVICE FOR WIPER

(71) Applicant: SCAN TOP ENTERPRISE CO., LTD., New Taipei (TW)

(72) Inventors: Che-Wei Chang, New Taipei (TW); Cheng-Kai Yang, New Taipei (TW)

(73) Assignee: SCAN TOP ENTERPRISE CO., LTD., New Taipei (TW)

( * ) Notice: Subject to any disclaimer, the term of this patent is extended or adjusted under 35 U.S.C. 154(b) by 0 days.

(21) Appl. No.: 16/877,546

(22) Filed: May 19, 2020

(65) Prior Publication Data
US 2021/0362686 A1 Nov. 25, 2021

(51) Int. Cl.
*B60S 1/40* (2006.01)
*B60S 1/38* (2006.01)

(52) U.S. Cl.
CPC ........... *B60S 1/4048* (2013.01); *B60S 1/3849* (2013.01); *B60S 1/4045* (2013.01); *B60S 2001/4054* (2013.01)

(58) Field of Classification Search
CPC .... B60S 1/3867; B60S 1/3865; B60S 1/3849; B60S 1/4038; B60S 1/4045; B60S 1/3868; B60S 1/40; B60S 1/4048; B60S 2001/4058; B60S 2001/4054; B60S 2001/4051
USPC ...................................................... 15/250.32
See application file for complete search history.

(56) References Cited

U.S. PATENT DOCUMENTS

| 9,744,946 | B2 | 8/2017 | Young, III et al. |
| 10,569,745 | B2 | 2/2020 | Fink et al. |
| 2007/0067940 | A1* | 3/2007 | Huang ................... B60S 1/3848 15/250.32 |
| 2015/0135463 | A1* | 5/2015 | Herinckx .............. B60S 1/3436 15/250.32 |
| 2020/0269819 | A1* | 8/2020 | Depondt ............... B60S 1/4048 |

FOREIGN PATENT DOCUMENTS

| CN | 203005370 U | 6/2013 |
| CN | 204978572 U | 1/2016 |
| CN | 205706607 U | 11/2016 |
| CN | 206351677 U | 7/2017 |

(Continued)

OTHER PUBLICATIONS

Evaluation Report dated Mar. 7, 2021 of corresponding China Utility Model CN212332598U.

(Continued)

*Primary Examiner* — Gary K. Graham
(74) *Attorney, Agent, or Firm* — Bacon & Thomas, PLLC (57) ABSTRACT

A rocker-type assembly device for a wiper includes a wiper fastening base (1), a connection base (2), and a control member (3). The wiper fastening base (1) is fixed to a wiper body (900) and has a shaft (11) and a buckling portion (12). The connection base (2) is combined with the wiper fastening base (1) and has a shaft groove (21) receiving the shaft (11). The connection base (2) swings in a rocker-like manner about the shaft (11) as a pivot. The swing arm (800) is assembled to the connection base (2). The control member (3) includes a buckling body (31) and swings together with the connection base (2) to drive the buckling body (31) to be engaged with the buckling portion (12) or disengaged from the buckling portion (12).

7 Claims, 12 Drawing Sheets

(56) References Cited

FOREIGN PATENT DOCUMENTS

| | | |
|---|---|---|
| DE | 102013019805 A1 | 5/2015 |
| DE | 102015225889 A1 | 6/2017 |
| EP | 2398679 B1 | 5/2013 |

OTHER PUBLICATIONS

European Search Report of the corresponding European patent application No. EP20175842.2 dated Oct. 26, 2020.

\* cited by examiner

ROCKER-TYPE ASSEMBLY DEVICE FOR WIPER

BACKGROUND

Technical Field

The present invention relates to assembling and disassembling of wipers, in particular to a rocker-type assembly device for a wiper.

Background

Regarding wipers, they have a wiper body made of rubber in contact with a surface of an object (e.g. a windscreen/windshield of a vehicle) to remove water by swinging of a swing arm.

However, in assembling conventional wipers, it is only required a first step-longitudinal assembly and a second step-transverse positioning, thus causing the conventional wipers tend to become detached. The reason is that, in a normal state, the swing arm is transversely movable, and once the swing arm is disengaged or becomes loose, the swing arm moves transversely to be detached. Therefore, when a positioning member for transverse positioning is broken or malfunctions, the wiper is easily detached and flies away during use. This problem has been criticized for a long time.

SUMMARY

It is an objective to provide a rocker-type assembly device for a wiper, and a rocker-like swinging movement is required to get the assembly device fastened or unfastened, thus preventing the wiper from being detached easily.

Accordingly, the present invention provides a rocker-type assembly device for a wiper, assembled between a wiper body and a swing arm, the assembly device comprising:

a wiper fastening base fixed to the wiper body and including a shaft and a buckling portion;

a connection base combined with the wiper fastening base and defining a shaft groove, the shaft groove being configured to receive the shaft, wherein the connection base swings in a rocker-like manner, about the shaft as a pivot, relative to the wiper fastening base, and the swing arm is assembled to the connection base; and a control member assembled to the connection base and swings together with the connection base, the control member including a buckling body;

wherein the control member is configured to drive the buckling body to be selectively engaged with the buckling portion and disengaged from the buckling portion by swinging together with the connection base.

Compared with conventional techniques, the present invention has the following effects. In a normal state, by staying in contact with a surface of an object for removing water therefrom, the wiper body keeps the connection base in right positions, so there is no way that it can be detached by swinging movements in this condition. Accordingly, the present invention can solve a problem that conventional wipers tend to be detached accidentally.

BRIEF DESCRIPTION OF THE DRAWINGS

The disclosure will become more fully understood from the detailed description and the drawings given herein below is for illustration only, and thus does not limit the disclosure, wherein.

DETAILED DESCRIPTION

Detailed descriptions and technical contents of the present disclosure are illustrated below in conjunction with the accompanying drawings. However, it is to be understood that the descriptions and the accompanying drawings disclosed herein are merely illustrative and exemplary and not intended to limit the scope of the present disclosure.

Referring to FIGS. 1 to 6, the present invention provides a rocker-type assembly device 100 for a wiper. The assembly device 100 is assembled between a swing arm 800 and a wiper body 900, so that the swing arm 800 can smoothly drive movement of the wiper body 900. The rocker-type assembly device 100 for the wiper (hereinafter briefly referred to as the assembly device 100) includes: a wiper fastening base 1, a connection base 2, and a control member 3. It should be noted that, after the wiper body 900 is assembled, it is in contact with a surface of an object (not illustrated, e.g. a windshield of a vehicle) for removing water therefrom, so the assembled wiper body 900 is parallel to the object in need of water removal.

The wiper fastening base 1 is fixed to the wiper body 900 and includes a shaft 11 and at least one buckling portion 12. In the present embodiment, there are two buckling portions 12.

The connection base 2 is detachably assembled on the wiper fastening base 1 as shown in FIGS. 1 to 4. The present invention does not limit the structure of the connection base 2. In the present embodiment, the connection base 2 can include two end panels 201, two side panels 202, a bottom panel 203, and a top panel (not labeled). The connection base 2 defines a shaft groove 21 in the bottom panel 203, which extends toward the top plate. The connection base 2 is provided with a sliding groove 22 in one end panel 201 toward the other end panel (not labeled). The shaft 11 is received in the shaft groove 21, so that the connection base 2 can swing in a rocker-like manner, about the shaft 11 as a pivot, relative to the wiper fastening base 1. The rocker-like swinging movement includes a forward swinging movement and a reserve swinging movement.

Figure 1:
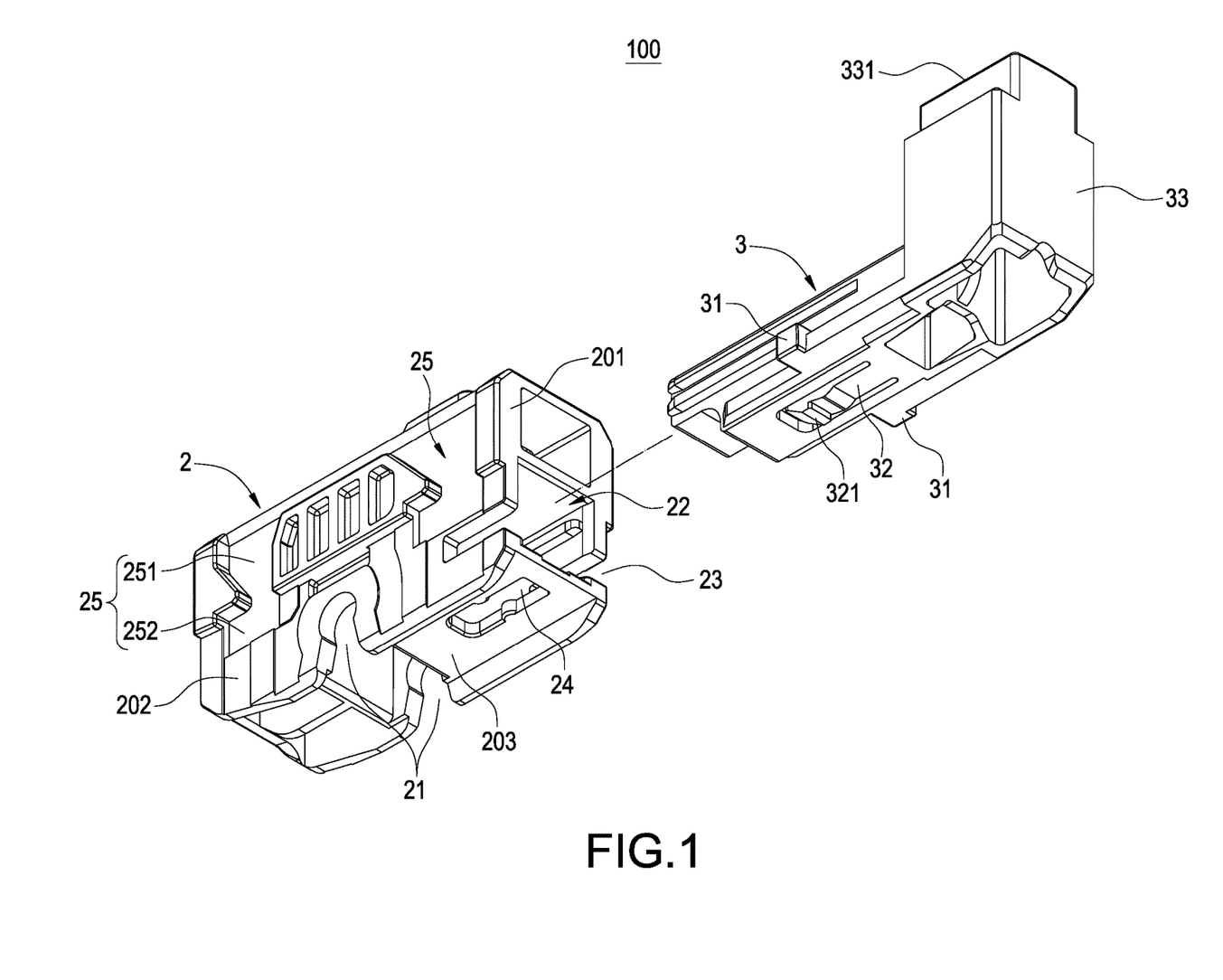
FIG. 1 is a perspective exploded view illustrating a connection base and a control member in an assembly device according to the present invention.
Figure 2:
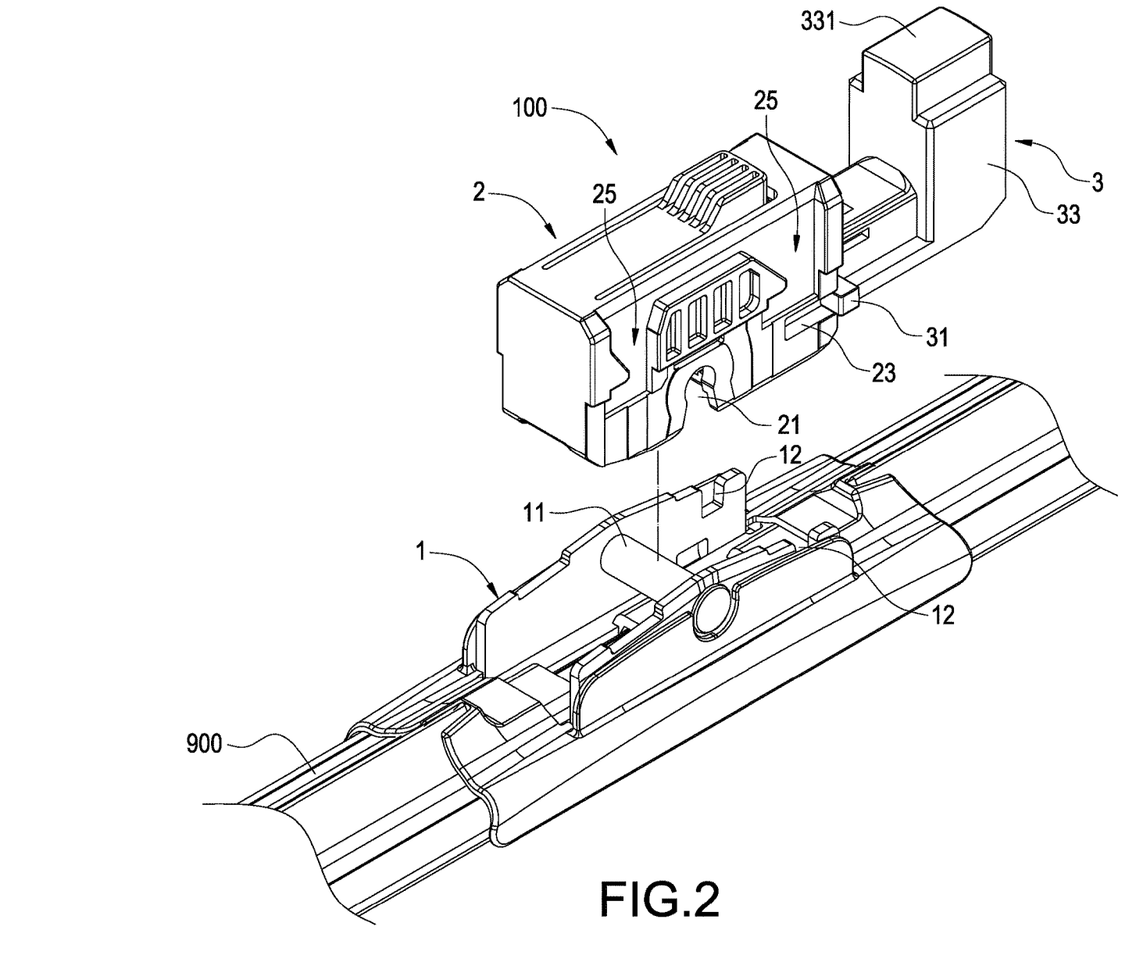
FIG. 2 is a perspective exploded view illustrating the assembly device before being assembled to a wiper body.

Preferably, as shown in FIG. 1, the connection base 2 is provided with the sliding groove 22 in the end panel 201, two trenches 23 respectively defined in the two side panels 202, and a reverse-buckling portion 24 in the bottom panel 203. The sliding groove 22 is open and extended from the end panel 201 toward the other end panel. The trench 23 communicates with the sliding groove 22, a notch of the trench 23 is defined in the end panel 201, and the lot trench 23 is extended from the end panel 201 toward the other end panel to form a tail end of the trench 23 in the end.

As shown in FIGS. 1 to 4, the control member 3 is assembled to the connection base 2, so that the control member 3 can swing together with the connection base 2. Preferably, the control member 3 can be slidably connected in the sliding groove 22. During a sliding process, the control member 3 is guided by the sliding groove 22 and moves linearly with respect to the connection base 2. The present invention is not intended to limit the structure of the control member 3. In the present embodiment, the control member 3 is provided with a reverse-buckling spring arm 32 and a pillar 33 cross-connected. The reverse-buckling spring arm 32 includes a reverse-buckling body 321. The pillar 33 has a controlled portion 331, and the pillar 33 is exposed outside the sliding groove 22. The two buckling bodies 31 are exposed outside the connection base 2 through the two trenches 23 respectively, so that exposed portions of the two bucking bodies can be engaged with the buckling portion 12.

Figure 3:
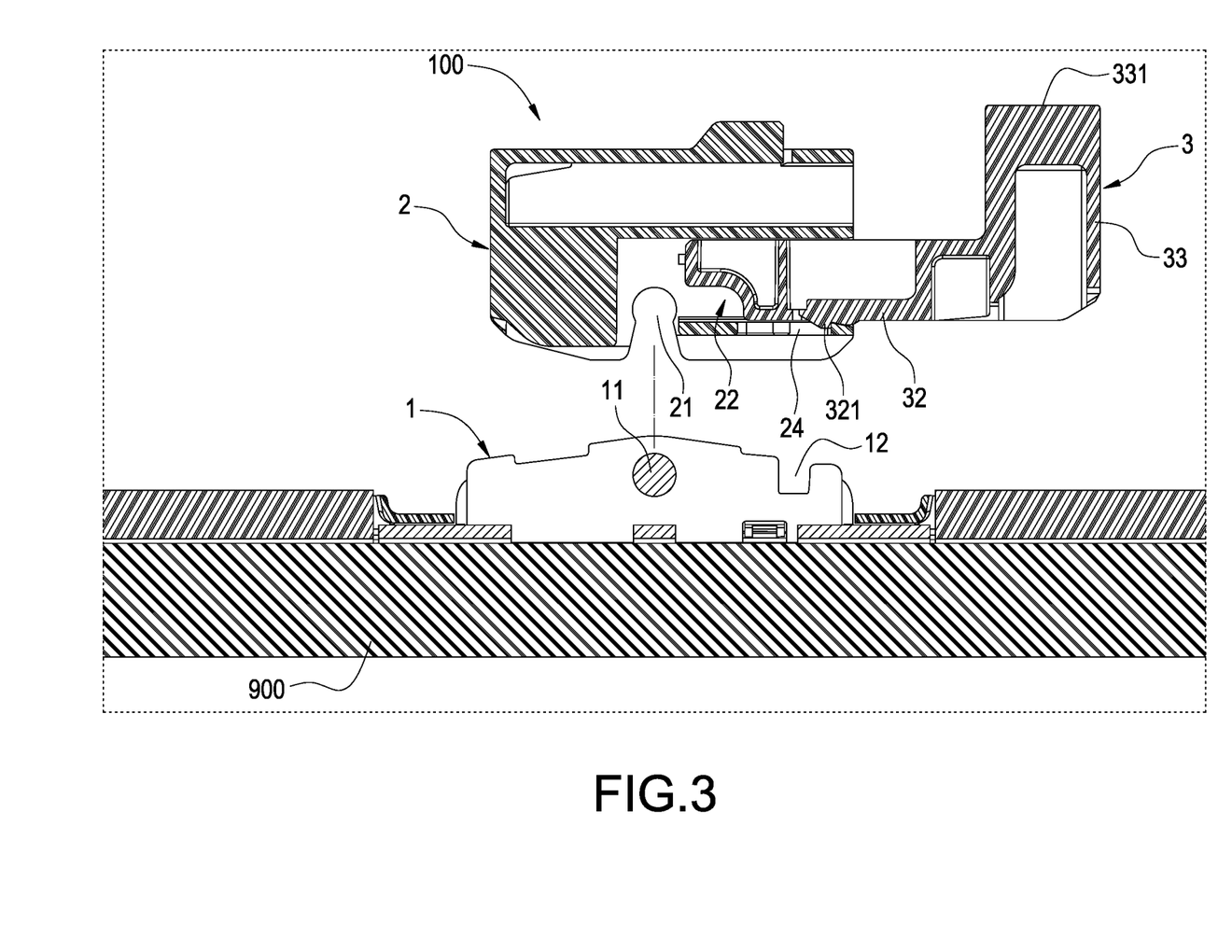
FIG. 3 is a cross-sectional view based on FIG. 2.

In order to prevent the control member 3 from falling off from the connection base 2, the reverse-buckling body 321 of the reverse-buckling spring arm 32 is buckled to the reverse-buckling portion 24 when the control member 3 is inserted into the sliding groove 22, as shown in FIG. 3. This way, the control member 3 is prevented from undesirable detachment and falling off from the sliding groove 22.

Figure 8A:
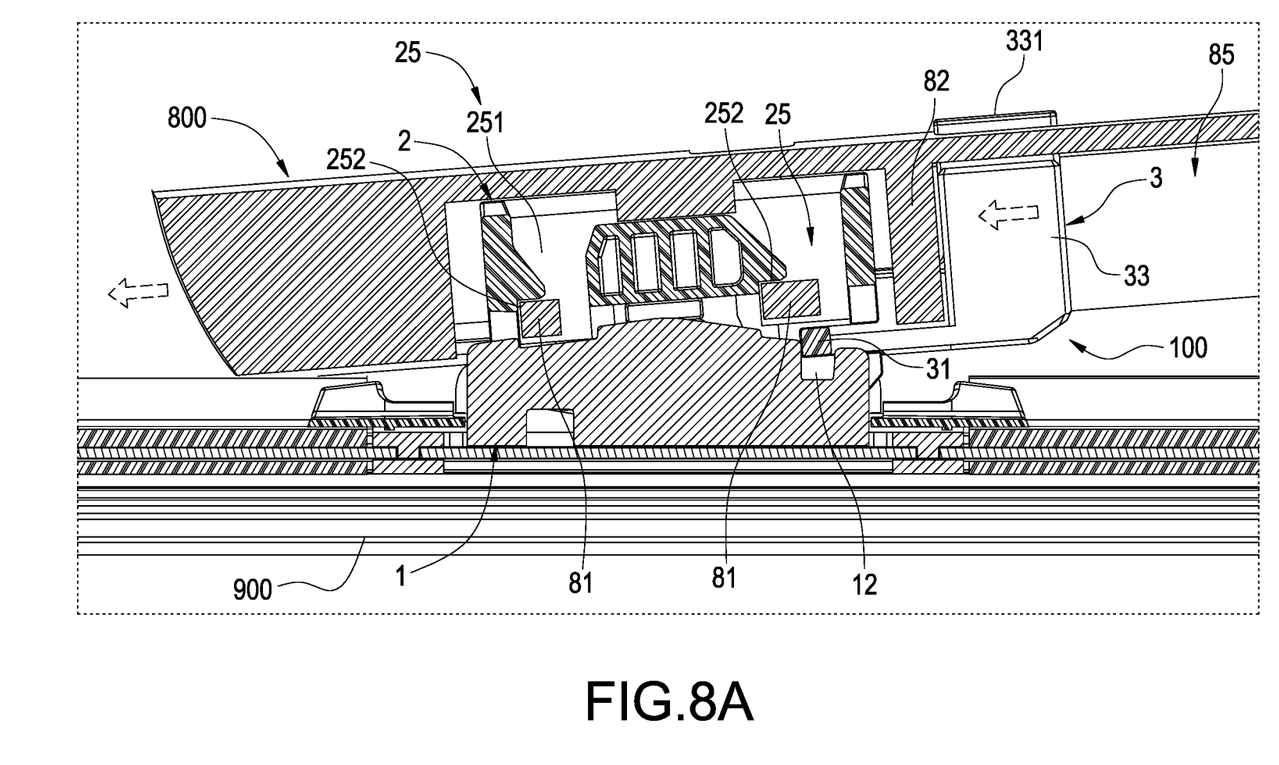
FIGS. 8A and 8B are cross-sectional views illustrating the assembly device after being assembled to the transversely movable swing arm and the control member.
Figure 9A:
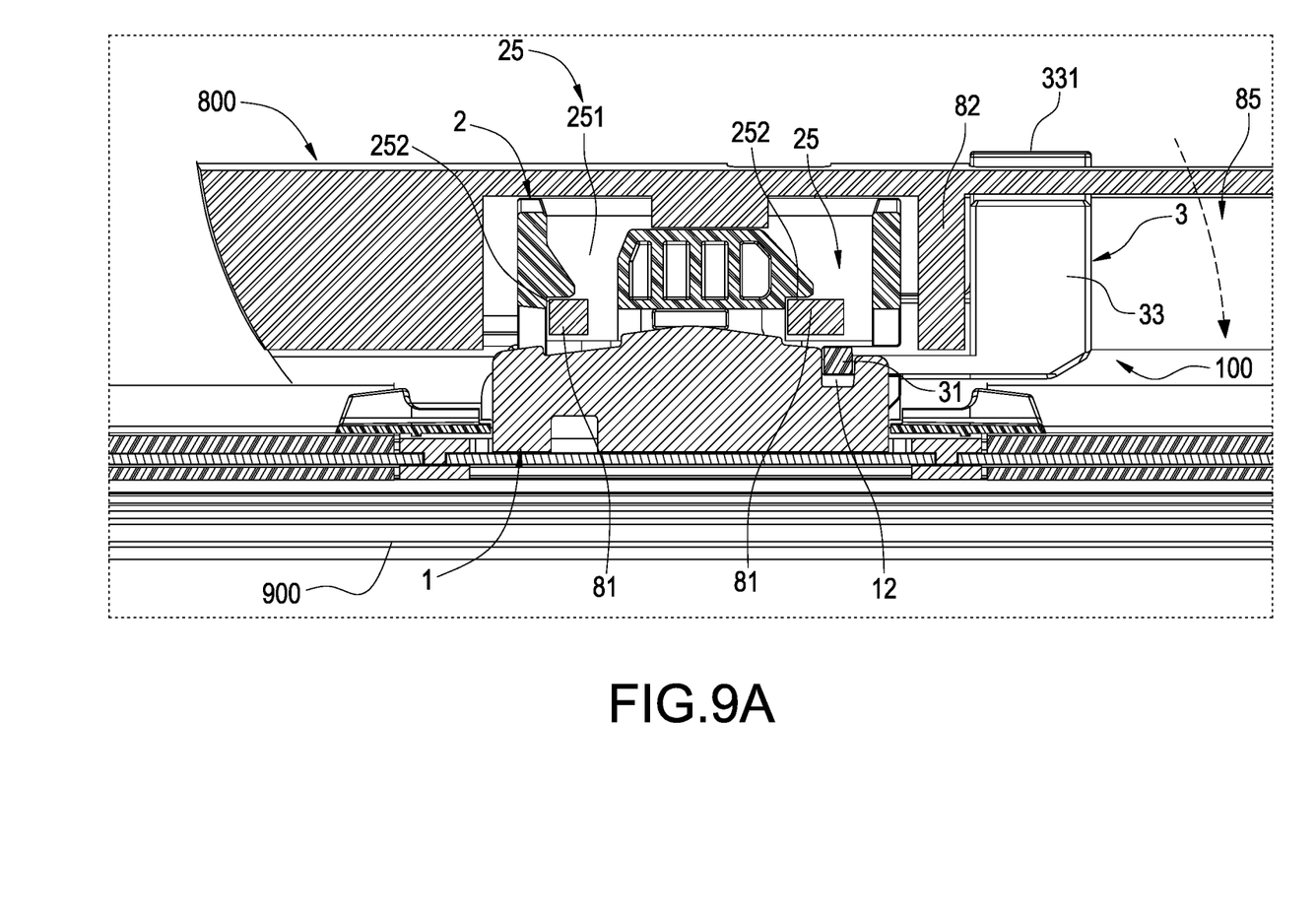
FIGS. 9A and 9B are cross-sectional views illustrating the assembly device are fastened through rocker-like swinging movement.

It should be noted that, the buckling portion 12 is a longitudinal groove with its opening facing upward, and the buckling body 31 and the buckling portion 12 are approximately the same height in a state that the connection base 2 and the control member 3 are parallel to the wiper fastening base 1, as shown in FIG. 9A. Therefore, it is necessary to move the buckling body 31 to diagonally above the opening of the buckling portion 12 by swinging reversely in a rocker-like manner (see FIG. 6), and then the control member 3 carries the buckling body 31 in a linear sliding movement to move it to just above the opening of the buckling portion 12 (see FIG. 8A), and finally, the buckling body 31 is engaged with the buckling portion 12 by swinging forwardly in an opposite direction.

As mentioned above, it is preferable that the linear sliding movement of the control member 3 can also fix the swing arm 800 at the same time. For this reason, some structures must be added to the connection base 2 and the swing arm 800, as detailed in the following three paragraphs.

Figure 6:
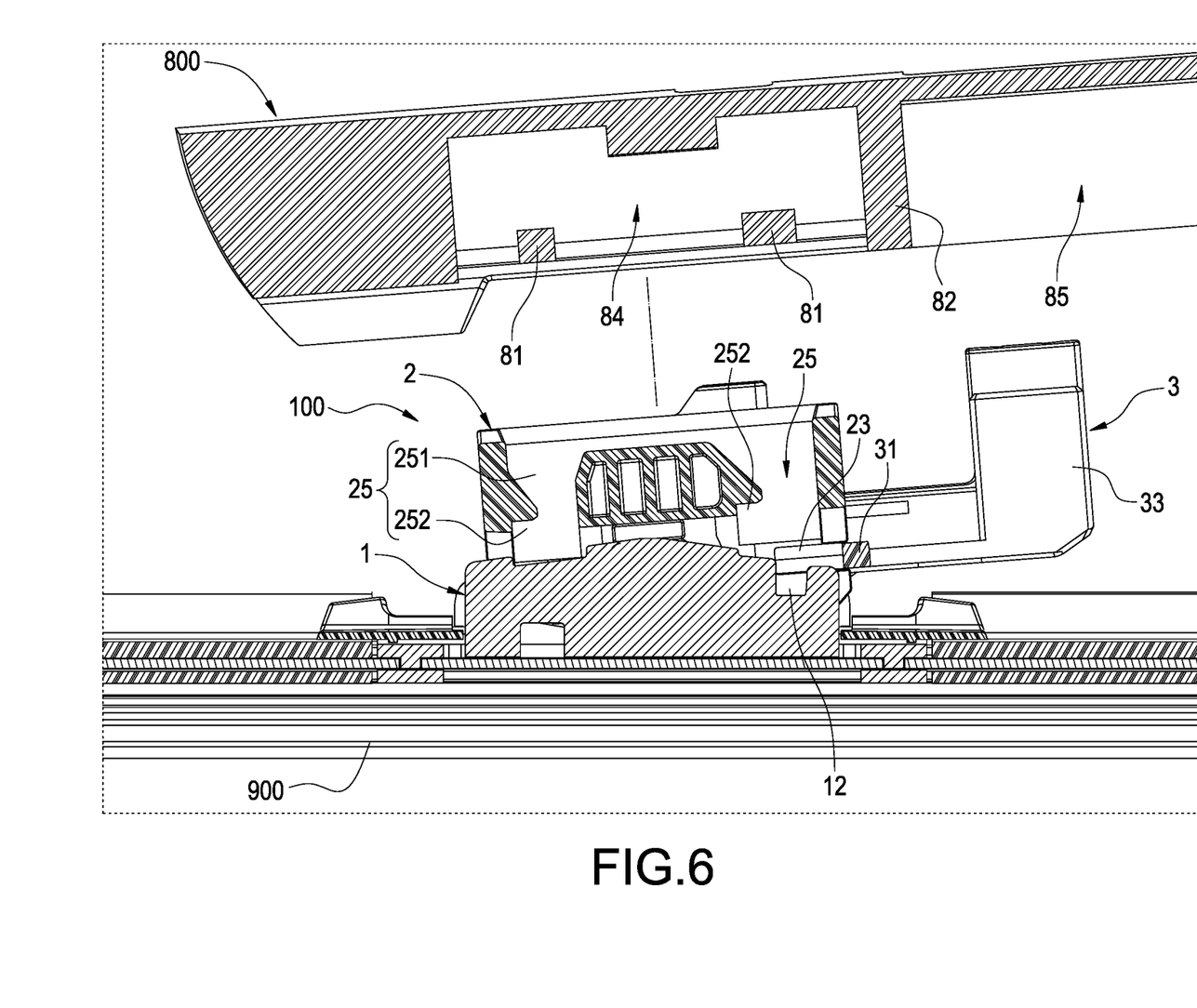
FIG. 6 is a cross-sectional view based on FIG. 5.

As shown in FIGS. 1 and 6, two restraining slots 25 are defined in outer walls of the connection base 2. The restraining slot 25 includes a longitudinal section 251 and a transverse section 252 communicating with each other and together forming a bent shape.

Figure 5:
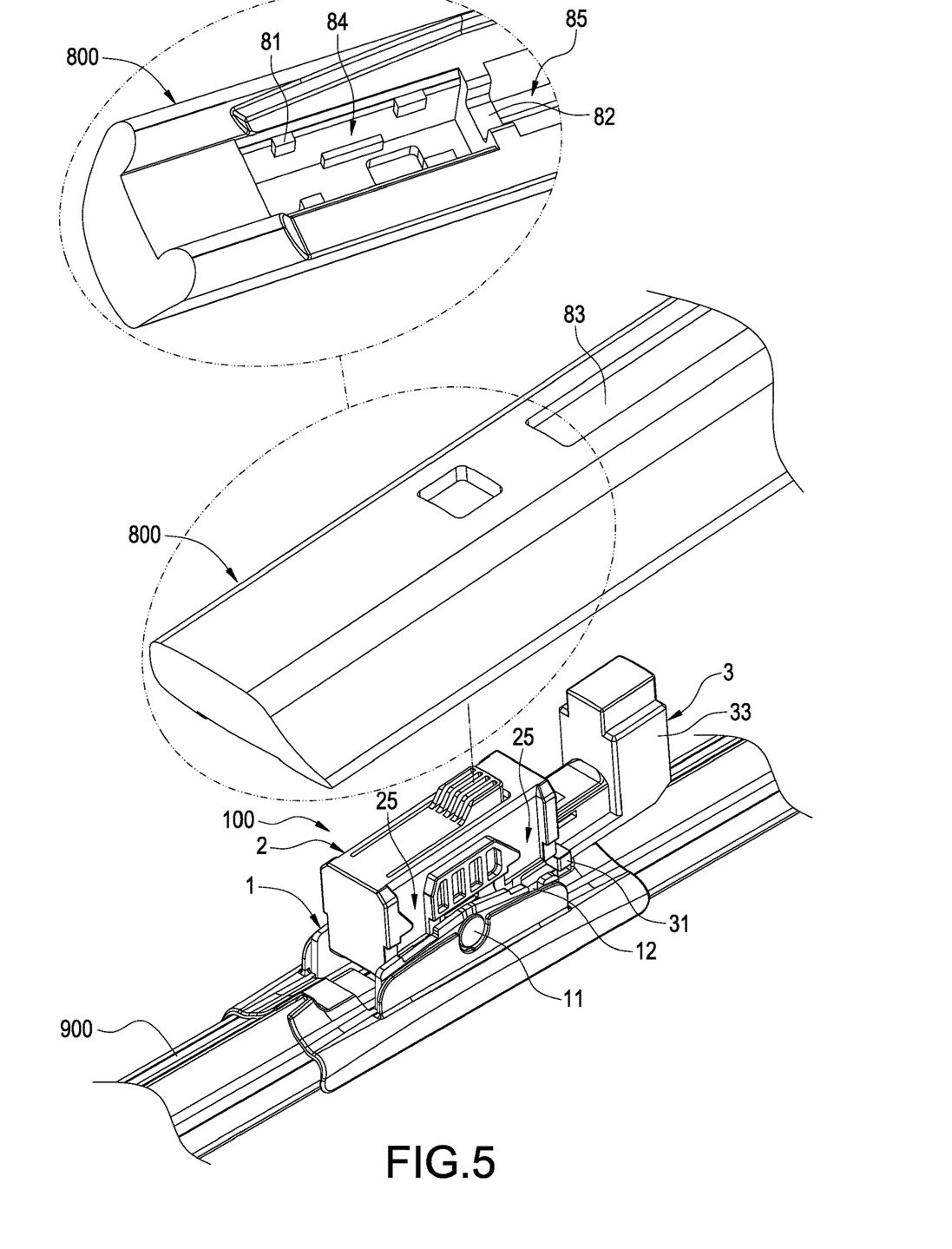
FIG. 5 is a perspective exploded view illustrating the assembly device before being assembled to a swing arm.

As shown in FIGS. 5 and 6, an accommodating space 84 and a movement space 85 are defined in a bottom of the swing arm 800, and the two spaces are separated by a blocking portion 82. An inner wall of the accommodating space 84 of the swing arm 800 is provided with a plurality of protruding bodies 81, and an opening 83 is defined in a top surface of the swing arm 800 corresponding to the movement space 85.

Figure 7A:
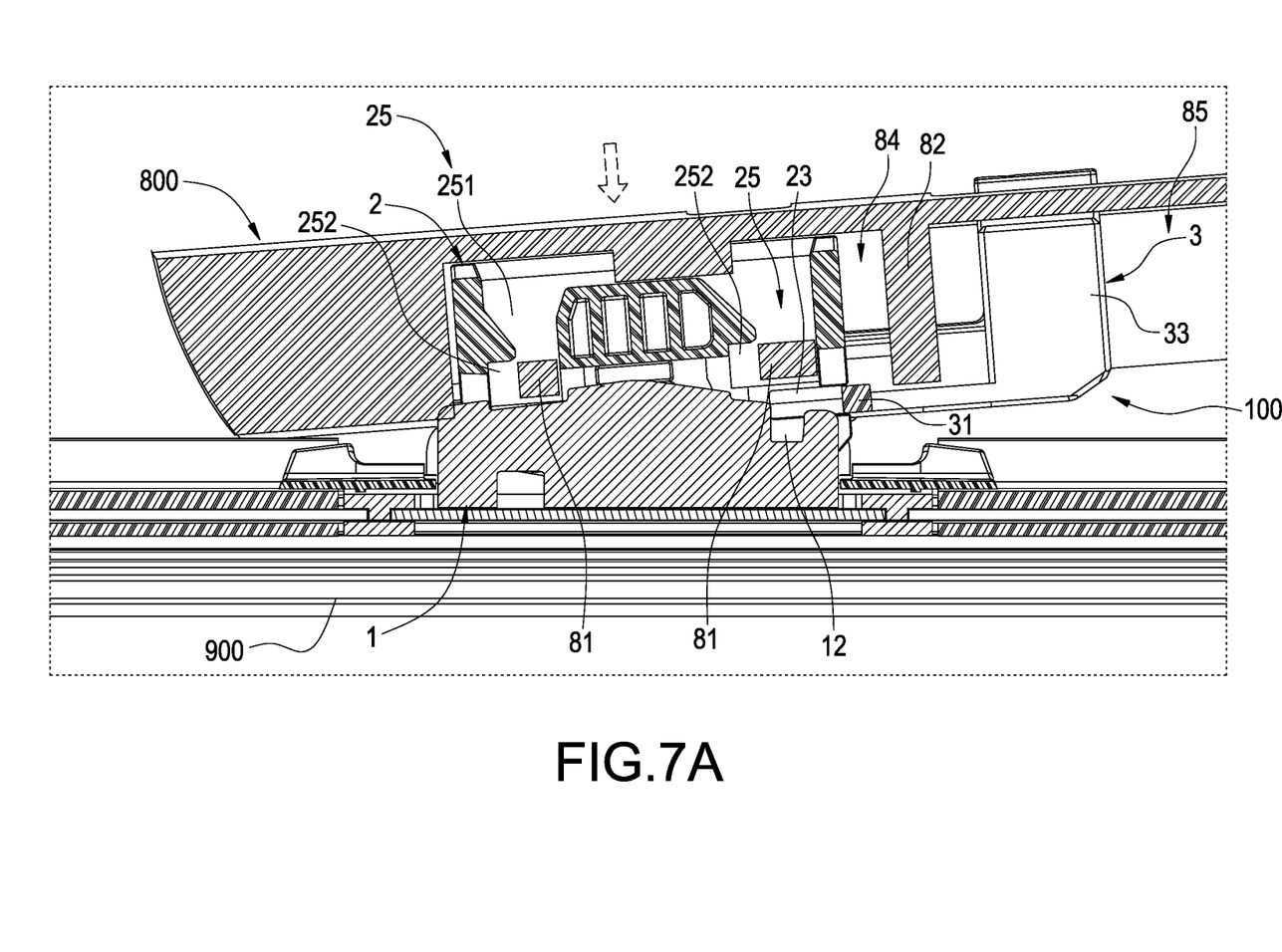
FIGS. 7A and 7B are cross-sectional views illustrating the assembly device after being longitudinally coupled to the swing arm.
Figure 7B:
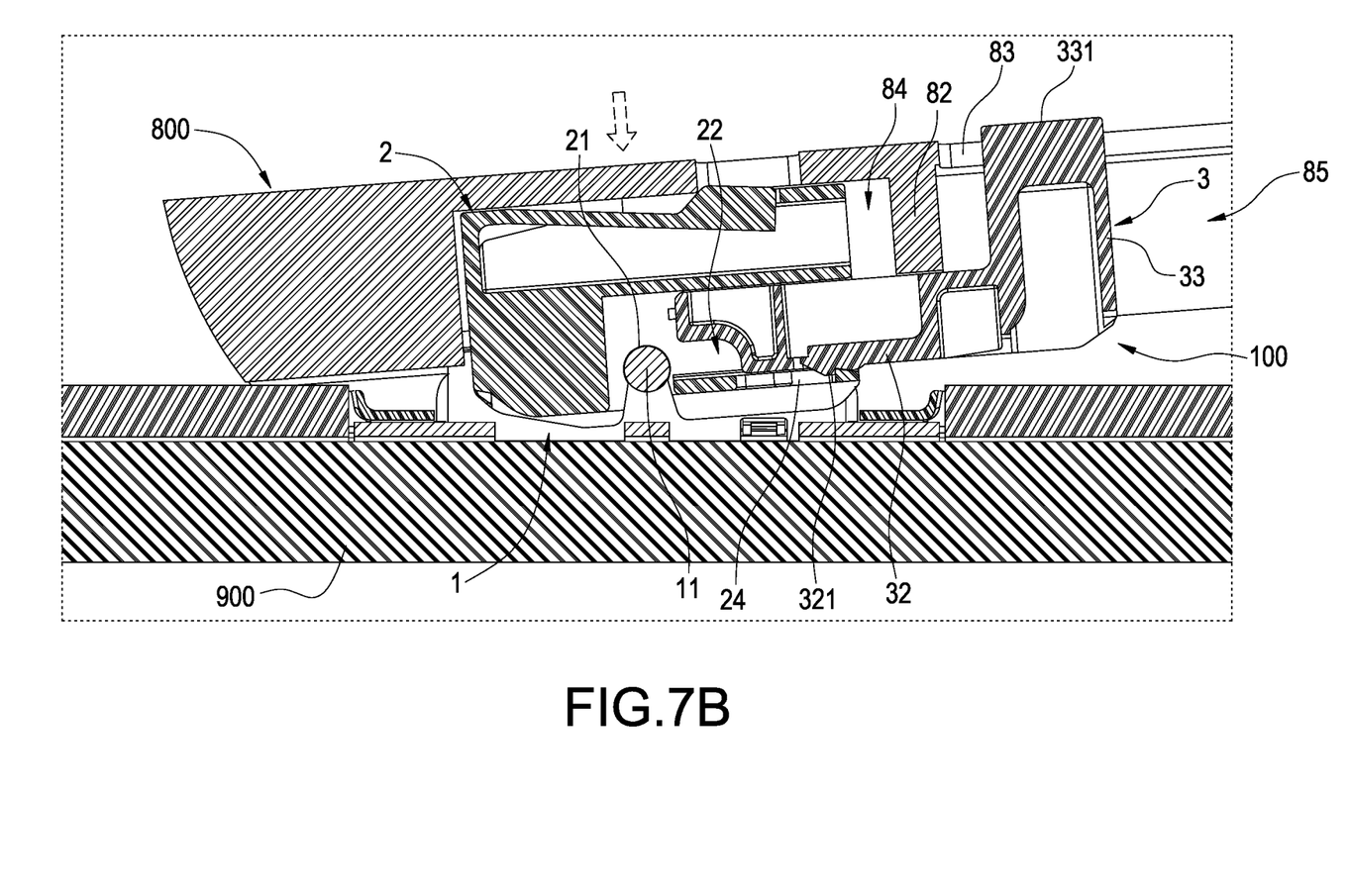
Figure 8B:
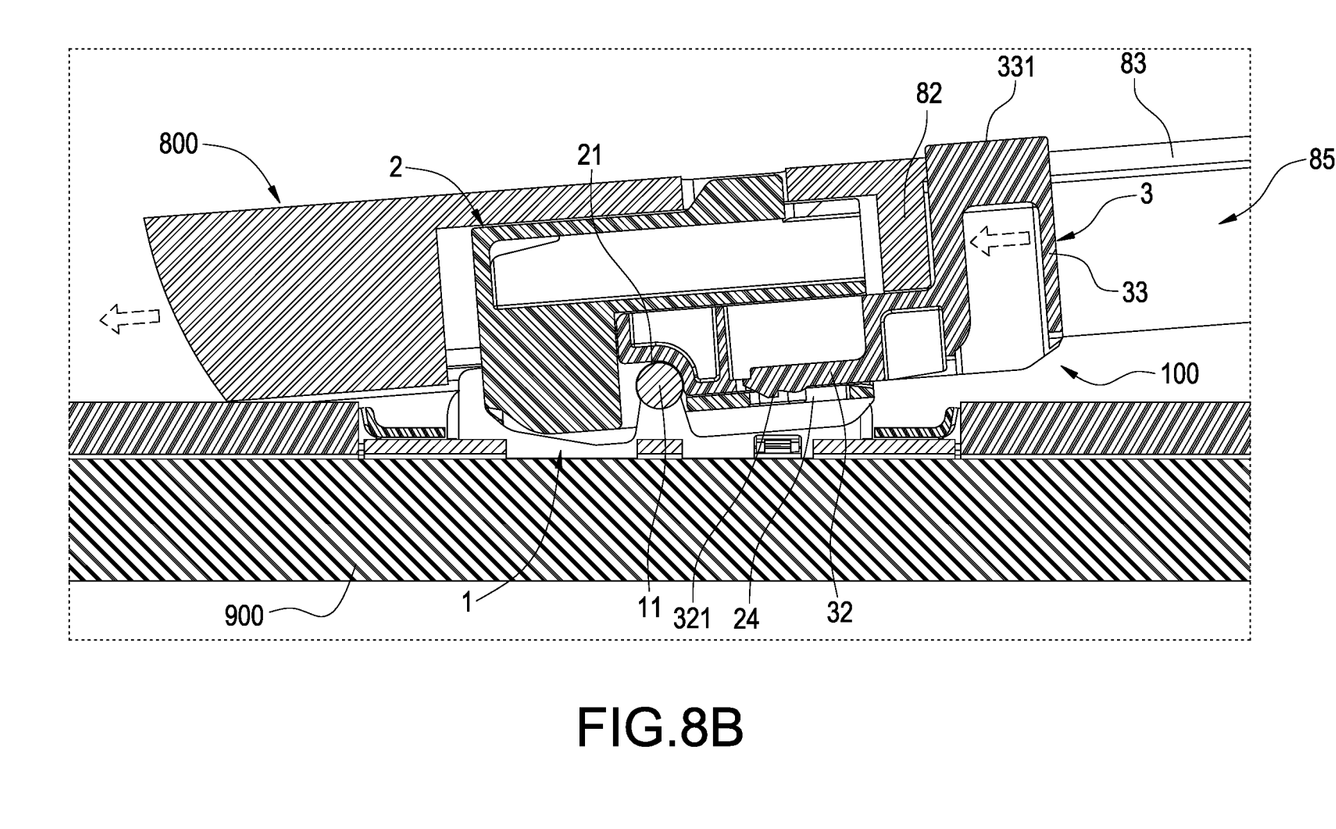

This way, as shown in FIGS. 6, 7A, and 7B, the accommodating space 84 of the swing arm 800 can be longitudinally engaged with the connection base 2 (a width of the accommodating space 84 is greater than a width of the connection base 2), so that each protruding body 81 of the swing arm 800 enters the longitudinal section 251 of each restraining slot 25. At this point, the pillar 33 of the control member 3 dose not block the blocking portion 82. As shown in FIGS. 8A and 8B, first, the swing arm 800 is operated to move laterally (to the left) with respect to the connection base 2, so that each protruding body 81 enters each transverse section 252 and is restrained from longitudinal movement in the transverse section 252. Accordingly, each protruding body 81 can only move laterally (in a direction toward the right) and cannot move longitudinally. And then, the control member 3 is operated to slide with respect to the connection base 2, so that the pillar 33 is moved in the movement space 85 and is blocked by the blocking portion 82 of the swing arm 800. That is to say, the pillar 33 is blocked by the blocking portion 82 when the swing arm 800 moves to the right, so that the swing arm 800 is firmly fixed to the assembly device 100 of the present invention.

In other embodiments not shown in the drawings, the present invention can also omit the linear sliding movement design, the wiper body 900 can be assembled to or detached from the swing arm 800 by performing the aforementioned two-direction swinging in sequence. For example, the present invention can add a restriction structure that prevents the buckling portion 12 from reversely detached after being engaged with the buckling body 31, and it is necessary to apply an external force to detach the buckling portion 12 from the buckling body 31.

Each operation actions of the present invention are further detailed as follows.

Figure 4:
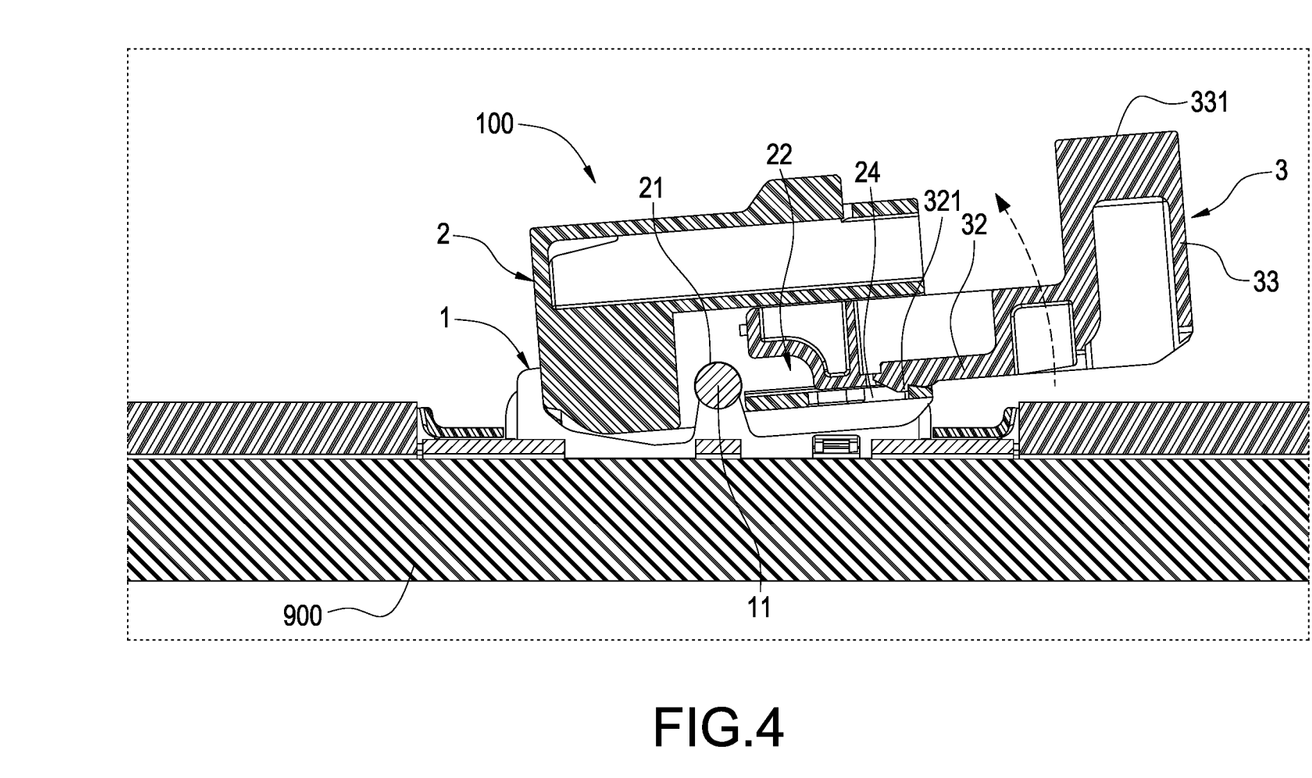
FIG. 4 is a cross-sectional view illustrating the assembly device after being assembled to the wiper body.
Figure 9B:
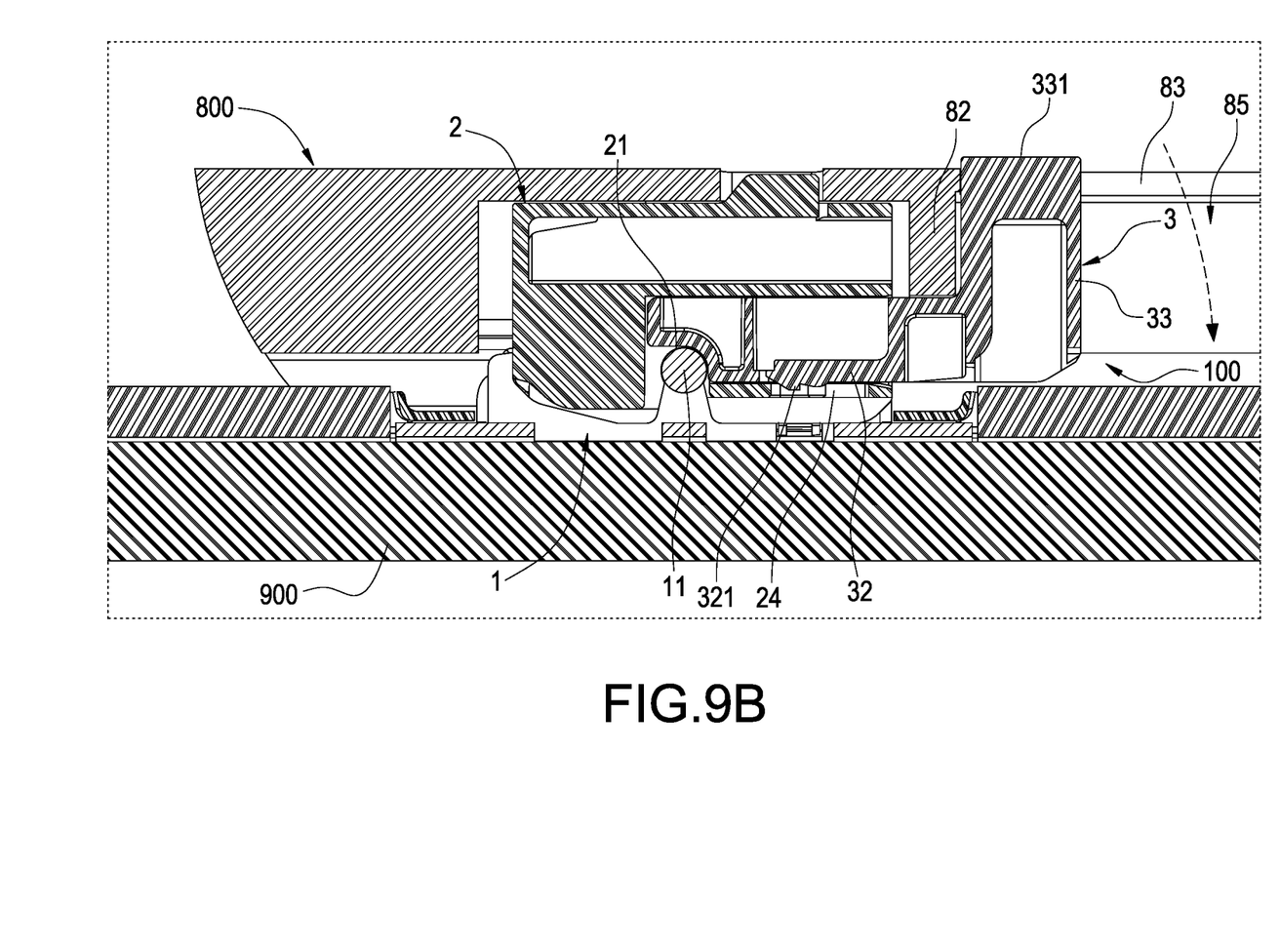

As shown in FIGS. 4 and 6, during assembling, first, the connection base 2 is tilted reversely and inclined, so that the buckling body 31 is moved to obliquely above the buckling portion 12, as shown in FIG. 6. Referring to FIGS. 7A and 7B, the swing arm 800 is then engaged with the connection base 2, so that the protruding body 81 enters the longitudinal section 251, and the controlled portion 331 of the pillar 33 is exposed or protrudes from the swing arm 800 through the opening 83. As shown in FIGS. 8A and 8B, the swing arm 800 is operated to move to the left with respect to the connection base 2, and the control member 3 is slid to the left (by pushing the controlled portion 331) with respect to the connection base 2 to make the protruding body 81 enter the transverse section 252 to be restrained from movement therein. Besides, the control member 3 not only enables the pillar 33 to block the swing arm 800 from moving to the right, but also allows the buckling body 31 to move to right above the buckling portion 12. Finally, as shown in FIGS. 9A and 9B, the connection base 2 is operated to swing forward and return to a normal state (that is, the connection base 2 is restored to a state that, the connection base 2 and the control member 3 are both parallel to the wiper fastening base 1), then the buckling body 31 can move downward and be engaged with the buckling portion 12, and the wiper body 900 is parallel to an object (not illustrated) for water removal. In other words, in normal conditions, by contacting the object in need of water removal, the wiper body 900 is restricted to be kept parallel to the object, and the connection base 2 is also restricted to be kept in its normal state, so it is impossible to disassemble in this situation. Unless the swing arm 800 and the wiper body 900 are deliberately moved away from the object in need of water removal, and the connection base 2 are swung reversely and inclined as shown in FIG. 8A, then the buckling body 31 can be engaged from the buckling portion 12 to facilitate subsequent disassembly.

On the contrary, when to disassemble, users only need to reverse the operation actions.

In summary, the rocker-type assembly device for the wiper of the present invention can indeed achieve the anticipated effects and purposes, and solve the problems of conventional techniques. The present invention completely meets the requirements for patentability. Therefore, a request to patent the present invention is filed according to patent laws. Examination is kindly requested, and allowance of the present invention is solicited to protect the rights of the inventor.

It is to be understood that the above descriptions are merely the preferable embodiments of the present invention and are not intended to limit the scope of the present invention. Equivalent changes and modifications made in the spirit of the present invention are regarded as falling within the scope of the present invention.

What is claimed is:

1. An assembly device for a wiper, assembled between a wiper body (900) and a swing arm (800), the assembly device (100) comprising:
    a wiper fastening base (1) fixed to the wiper body (900) and including a shaft (11) and a buckling portion (12);
    a connection base (2) combined with the wiper fastening base (1) and defining a shaft groove (21), the shaft groove (21) being configured to receive the shaft (11), wherein the connection base (2) is configured to swing in a rocker manner, about the shaft (11) as a pivot, relative to the wiper fastening base (1), and the swing arm (800) is assembled to the connection base (2); and
    a control member (3) assembled to the connection base (2) and configured to swing together with the connection base (2), the control member (3) including a buckling body (31);
    wherein the control member (3) is configured to drive the buckling body (31) to be selectively engaged with the buckling portion (12) and disengaged from the buckling portion (12) by swinging together with the connection base (2),
    wherein the connection base (2) is provided with a reverse-buckling portion (24), the control member (3) is provided with a reverse-buckling spring arm (32), and the reverse-buckling spring arm (32) is buckled to the reverse-buckling portion (24).

2. The assembly device for the wiper according to claim 1, wherein the connection base (2) is provided with a plurality of restraining slots (25), a plurality of protruding bodies (81) of the swing arm (800) are respectively positioned for limited movement in the restraining slots (25) by moving in a direction, and the control member (3) is moved with respect to the connection base (2) to block the swing arm (800) in another direction opposite to the direction.

3. The assembly device for a wiper according to claim 2, wherein at least one of the restraining slots (25) includes a longitudinal section (251) and a transverse section (252) communicating with each other and together forming a bent shape, at least one of the protruding bodies (81) enters the at least one of the restraining slots (25) through the longitudinal section (251), and the at least one of the protruding bodies (81) is positioned for limited movement in the transverse section (252).

4. The assembly device for the wiper according to claim 2, wherein the connection base (2) is provided with a sliding groove (22), the control member (3) is slidably connected to the sliding groove (22), and the control member (3) is movable with respect to the connection base (2) through the sliding groove (22).

5. The assembly device for the wiper according to claim 4, wherein the control member (3) is connected to a pillar (33), and the pillar (33) is exposed outside the sliding groove (22) and blocks the swing arm (800).

6. The assembly device for the wiper according to claim 4, wherein the connection base (2) is further provided with a trench (23), the trench (23) communicates with the sliding groove (22), and the buckling body (31) is movable in the trench (23) by moving the control member (3) with respect to the connection base (2).

7. The assembly device for the wiper according to claim 1, wherein the buckling portion (12) is a longitudinal groove with an opening facing upward, and the buckling body (31) is correspondingly buckled in or unbuckled from the buckling portion (12).

* * * * *